Oct. 4, 1938.　　　L. C. HOPKINS, JR　　2,131,890
BRAZING
Filed July 31, 1936

INVENTOR
LLOYD C. HOPKINS, JR
BY
Charles M°Clair
ATTORNEY

Patented Oct. 4, 1938

2,131,890

UNITED STATES PATENT OFFICE 2,131,890

BRAZING

Lloyd C. Hopkins, Jr., Jersey City, N. J., assignor, by mesne assignments, to Radio Corporation of America, a corporation of Delaware Application July 31, 1936, Serial No. 93,569

1 Claim. (Cl. 113—112)

My invention relates to brazing or soldering, particularly to brazing gas tight a plurality of metal eyelets in a metal plate such as the header of an electron discharge device.

The usual stem or header used in the construction of the metal envelope of an electron discharge device comprises a disc or plate joined to the rim of a cup-shaped envelope, the lead-in wires for electrodes in the envelope being sealed gas tight in flanged tubular eyelets welded in openings in the plate. The flanges of the eyelets, which are usually drawn, are frequently fractured and cracked and cannot be joined gas tight to the header even by welding, so it has been proposed to braze the flange of each eyelet to the header after welding by placing a small ring of copper about each eyelet and firing at the proper temperature. Such a procedure is relatively slow, and in high speed production the brazing may be non-uniform and the cost of individually treating and brazing each eyelet is prohibitive.

According to my invention I braze each of the eyelets in a single operation from a single source of brazing material placed on the header. A small groove stamped on the face of the header extends sufficiently close to each of the eyelet openings in the header to partially or wholly underlie the flanges of the eyelets inserted in the openings. A mass of brazing material, such as copper, and conveniently in the form of a small bar, is placed at any desired point over the groove and the header is fired for several minutes at a temperature well above the melting point of the brazing material. I have found that molten copper, for example, flows into and along the groove, and is drawn under and around each of the eyelet flanges, distributing itself uniformly around the flanges. As distinguished from the old method where individual bits of copper were required to be placed on each eyelet, the brazing of several eyelets according to my invention is accomplished by placing a single bar of copper on the header.

Figure 1:
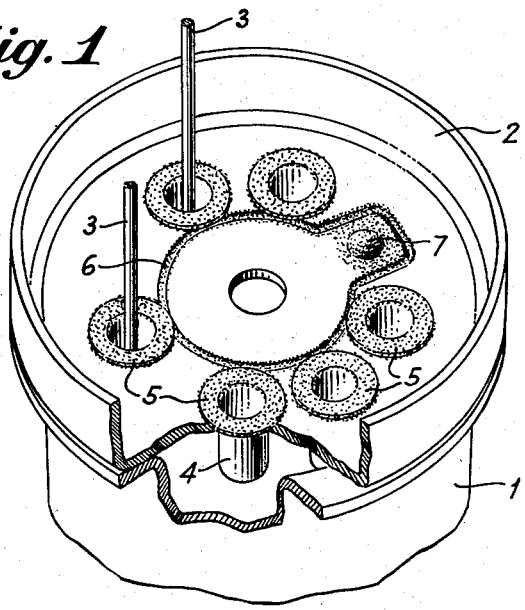
Figure 2:
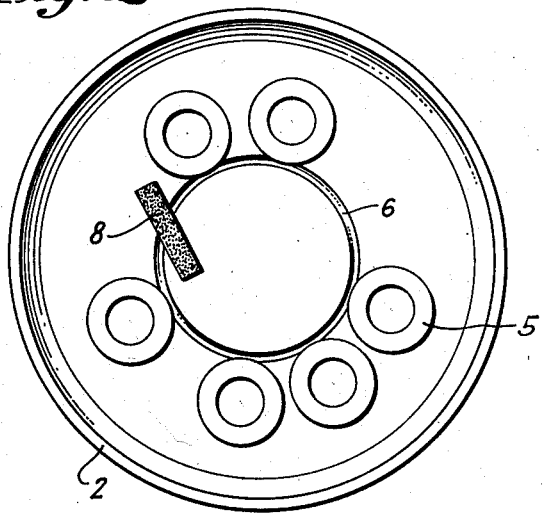

My invention is specifically defined in the appended claim and preferred embodiments are disclosed in the following specification and the accompanying drawing in which:

Figure 1 is a sectioned perspective view of one form of header brazed in accordance with my invention, and Figure 2 is a bottom view of a header brazed in accordance with further features of my invention.

In Figure 1 is shown a conventional metal envelope 1 which is closed at its end by a stem or header 2 through which electrode lead-in wires 3 are sealed gas tight in short tubular eyelets 4 each having on its inner end a flange 5. Each eyelet may be inserted in close-fitting holes in the header and may be conveniently secured to the header as by welding.

To insure a gas tight junction suitable for vacuum tube use between eyelet flanges 5 and the face of the header it has been found necessary to braze together the flange and the header. According to this invention I propose to scratch, cut or stamp in the face of the header a groove 6 of such length and outline as to underlie the edge of each eyelet flange. With a circular arrangement of eyelets, the groove may conveniently be a circle tangent to the inner edges of the several eyelet flanges. According to one embodiment of my invention the groove encircles a dimple or lug on the header, which locates a ring of brazing material 7, such as copper. A groove stamped in the smooth face of a steel header appears upon close examination to be a shallow trough or ditch, roughened along its concaved surface. Upon heating, copper 7 melts, runs into the groove and flows along the roughened surface of the groove, apparently by capillary action. The edge of each flange, which is usually roughened when drawn, overlies the groove and, due apparently to capillary action similar to that in a wick, the molten copper is drawn and distributed uniformly around, over, and under the flanges. The brazing material thus flows from the source at 7 to all points along the groove and around the flanges, distributing itself uniformly regardless of the position of the header during firing, the flow of the liquid copper apparently being dependent on the phenomenon known as capillary action. To minimize oxidation of the metal parts of the header during brazing it is preferred that the heating be done in the reducing atmosphere of hydrogen.

The circular groove may, if desired, be formed inside and concentric with the circle of eyelets, as shown in Figure 2, and the copper in the form of a small bar 8 may be welded or otherwise secured over the groove. It has been found that when the copper bar 8 is melted in a reducing atmosphere the molten copper flows into and along the groove and, as set forth in connection with Figure 1, is drawn from the groove by the eyelet flanges. The capillary attraction of the roughened portions of the eyelets and grooves for the copper is so pronounced that the header may be placed in any angular position during heating and the copper will with facility uniformly distribute itself in the spaces to be brazed.

One standard form of header about 1 inch in diameter and made of nickel plated steel, .030 inch in thickness, has been sealed with eyelets in accordance with my invention with particular success where the header is fitted with eyelets made of cobalt-nickel-iron alloy, commercially known as "Fernico" or "Kovar", which makes a good seal with glass, and having flanges about .23 inch in diameter. A 60 degree V-shaped groove about .012 inch in depth is stamped in the face of the header so that its edge just underlies the outer rim of the eyelet flanges which are welded to the header. The copper for the brazing is conveniently cut from copper ribbon stock .030 x .056 inch in cross section into various lengths depending on the number of eyelets to be brazed. For a header having seven eyelets a bar of this copper ribbon is cut about 7 mm. long and spot welded over the groove. The header is then placed with the flanges down upon a constant speed conveyor which carries the header through a hydrogen furnace in which the header is heated to a temperature of aboout 1130 degrees centigrade for a period of about 9 or 10 minutes to melt and distribute the copper. The conveyor then carries the header through a hydrogen filled cooling chamber of such length that the header is cooled to a temperature below the oxidizing temperature of the metal in air, and usually to near room temperature. Where rolled steel is used for the header material I have obtained the best results by nickel plating the faces of the header before the insertion of the eyelets, as the comparatively rough surface of untreated steel seems to absorb quantities of copper and prevent its uniform distribution along the grooves and the surfaces to be brazed. The die for pressing the groove in a nickel plated steel header appears to rupture the nickel plating and expose the grain of the steel along the path the copper is to follow.

Since many modifications may be made in my invention without departing from the spirit thereof, it is desired that my invention be limited only by the scope of the appended claim and the prior art.

I claim:

The process of brazing a plurality of tubular eyelets fitted into spaced openings in a nickel plated metal disc, the eyelets having radial flanges in contact with the nickel plated surface of the disc, comprising fitting said eyelets in the spaced openings of the disc with the eyelet flanges in contact with the nickel plated surface, fracturing the nickel plating along a narrow path communicating with the surface of contact between the disc and each eyelet flange, melting a mass of copper on the nickel surface at one point in said path to cause the metal to flow by capillary action over the plate only along said path and into the spaces between the flanges and said disc.

LLOYD C. HOPKINS, Jr.